United States Patent [19]
Thedford

[11] Patent Number: 5,878,522
[45] Date of Patent: Mar. 9, 1999

[54] STRANDED WIRE TOOL

[76] Inventor: Alan Thedford, 4004 N. 8th Ave., Pensacola, Fla. 32504

[21] Appl. No.: 722,970

[22] Filed: Sep. 30, 1996

[51] Int. Cl.⁶ .................................................. A01K 97/00
[52] U.S. Cl. ....................................................... 43/1; 43/4
[58] Field of Search ...................... 43/1, 53.5, 4; 289/17; 269/907; 81/177.1, 489, 492

[56] References Cited

U.S. PATENT DOCUMENTS

| | | | |
|---|---|---|---|
| 2,859,994 | 11/1958 | Whitlinger | 43/1 |
| 2,899,226 | 8/1959 | Lint | 43/1 |
| 3,603,021 | 9/1971 | Nunley | 43/53.5 |
| 3,625,556 | 12/1971 | Stromberg | 289/17 |
| 3,866,959 | 2/1975 | Matarelli | 289/17 |
| 3,877,736 | 4/1975 | Zauskey | 289/17 |
| 3,965,605 | 6/1976 | Allen | 43/1 |
| 4,008,913 | 2/1977 | Cole | 289/17 |
| 4,333,614 | 6/1982 | Flax | 43/1 |
| 4,656,769 | 4/1987 | Walker | 43/1 |
| 4,660,314 | 4/1987 | Janssen et al. | 43/1 |
| 4,714,281 | 12/1987 | Peck | 289/17 |
| 4,796,372 | 1/1989 | Klein | 43/1 |
| 4,864,762 | 9/1989 | Cox | 43/1 |
| 4,870,772 | 10/1989 | Johns | 43/1 |
| 5,060,995 | 10/1991 | Goldstein | 81/177.1 |

*Primary Examiner*—Kurt Rowan
*Attorney, Agent, or Firm*—Patent & Trademark Services; Thomas Zack; Joseph H. McGlynn

[57] ABSTRACT

A tool for attaching wire to a fishing attachment having an eye loop. The tool has an opened tapered stainless steel wire hook fit into the tool's head which can rotate with respect to a hollow handle. The handle's body may have internal ridges which engage peripheral external ridges on the hook's head in a snap-on fit. Similarly, a cap may cover both the head and hook and be mounted on the tool's handle. ABS plastic and the injection molding process can be used to made the tool's head and body. Also, disclosed in a method of using the tool to attach an eyed fishing attachment to a wire in a tightly helical wrap manner.

3 Claims, 1 Drawing Sheet

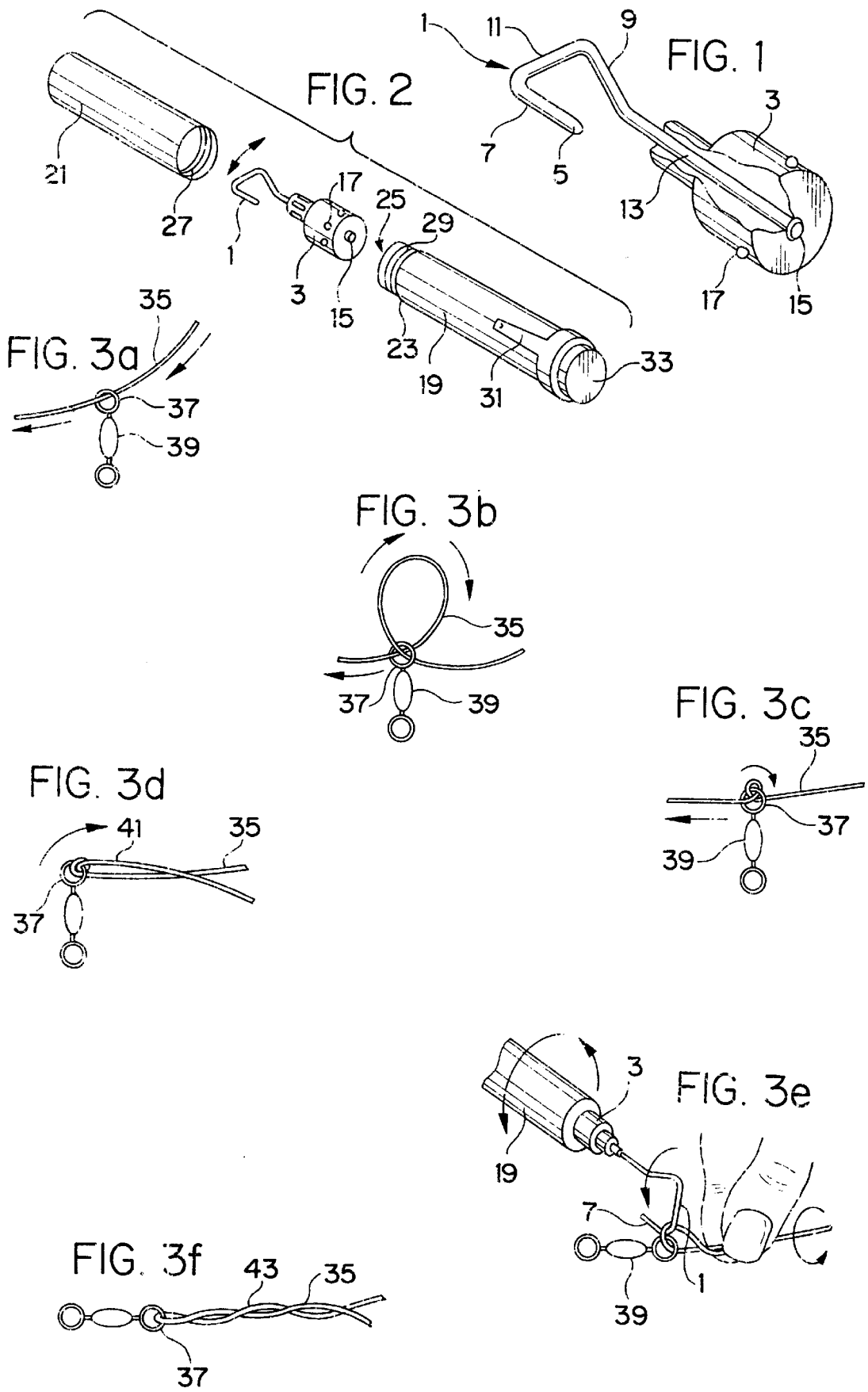

STRANDED WIRE TOOL

BACKGROUND OF THE INVENTION

This invention relates generally to fishing devices and more specifically to a new tool and method to secure hooks, flies and other tackle attachments to a length of stranded fishing wire. In doing so, it has proved difficult without the aid of some type of tool to assist in the attachment process. The present invention sets forth a new fishing tool and the process of using this tool to secure the desired fishing implement.

DESCRIPTION OF THE PRIOR ART

Several types of fishing tools or devices are known in the prior art. In U.S. Pat. No. 4,656,769 to Walker a device for attachment of loose dubbing material to the thread used in making fishing flies is disclosed. The patent (U.S. Pat. No. 4,660,314) to Janssen et al. discloses a fish hook snell tool for forming a knot from a fishing line on a fish hook. Further, in U.S. Pat. No. 4,864,762 to Cox there is disclosed a tool for tying a fishing line to a hook. And in U.S. Pat. No. 4,870,772 to Johns a bobbin and knot tying tool for attaching a fishing line to hooks is described. None, however, disclosed the particular fisherman's tool used to secure hooks, flies and other tackle attachments to stranded wire material as set forth in this specification.

SUMMARY OF THE INVENTION

A tool for attaching fishing attachments having a handle with a swivel mounted angled opened hook end whose side legs are tapered together towards the hook's opened side. The handle may have a detachable head section and a hollow body section both of which can be made of ABS plastic material. Additional features include a covering snap-on cap for the head and an optional pocket clip on the handle's body section. To use the tool a hand over loop is first made though the eye of the fishing implement to be attached with a length of stranded wire. Keeping an eye on the attachment while firmly held, the user would then insert the tool's hook through the eye of another type of tackle attachment. By twisting the tool in tight revolutions the attachment's eye is bent around the wire. A tight helical wrap is made by this twisted wire. To attach a swivel attachment, the tool's hook is passed through the same eye as the wire and used normally. Many fishing attachments including hooks, flies, swivels and other attachments can be securely attached without sleeve connectors with this invention.

It is the primary object of the present invention to provide for an improved fishing attachment tool.

Another object is to provide for such a tool and the method of its use.

These and other objects and advantages of the present invention will become apparent to readers from a consideration of the ensuing description and the accompanying drawings.

BRIEF DESCRIPTION OF THE DRAWINGS

FIG. 1, is a perspective view of the invention's preferred embodiment for the tool's hook and head members with a section of the head cut away.

FIG. 2 is an exploded perspective view of the invention's preferred tool embodiment.

FIG. 3 shows the sequential steps -(a) to (e)- to arrive at the attached fishing implement (step f) using the preferred embodiment tool.

DESCRIPTION OF THE PREFERRED EMBODIMENT

FIG. 1 is a perspective view of the invention's preferred embodiment for the tool's hook I and head member 3 with a section of the head cut away. The C-shaped hook is made of stainless steel wire having an opened end having a free terminal end 5. The two facing hook legs sections 7 and 9 are tapered towards each other from the back joining hook section 11 to the opened end 5. Thus, the leg section 7 forms a first angled leg for the hook end while the section 9 is a second taper leg section and the distance between the free terminal end 5 and the section 9 is an open free end. Opposite this free end and joining the hook's side 9 is the straight hook head section 13 which extends through the plastic head's length and is rigidly mounted in the head 3. At section 13 free end there is an enlarged mushroom shaped rivet end 15. Near this end piece extending around the circumference of the head are several (two shown) spaced male ridges 17 used to snap join the head to the tool body member.

FIG. 2 is an exploded perspective view of the invention's preferred tool embodiment. This view contains the FIG. I hook and tool head and the hollow plastic cylindrically shaped tool elongated body member 19 as well as the snap-on head cap 21. Internal circumferential body grooves 23 (shown by dotted lines) located near the tool body's opened head receiving front 25 are positioned to receive the head's spaced ridges 17 in a snap-on type of fit. When in position, the cap 21 fits completely over the hook and tool's head and is joined to the body's outer periphery in a snap-on manner by engaging internal cap ridges 27 with the body's external surface peripheral ridges 29. An optional pocket clip 31 surrounds the body's circular periphery near its closed end 33. As indicated by the arrows in FIG. 2, head 3 and its fit mounted hook 1 are mounted in the handle such that the head/hook freely rotate with respect to the tool's body 19 in the ridge 17/groove 23 attachment.

FIG. 3 shows the sequential steps (a) to (e) to arrive at the attached fishing implement (step f) using the preferred embodiment tool. In the first step (a), a strand of wire 35 is fed through the eye loop 37 of the fishing attachment 39.

Next, step (b), the wire 35 is looped through the eye 37 and then in step (c) the wire's ends are pulled tight to engage the eye. Chronologically in step (d) the wire two ends are pulled over the eye and crossed at an angle as shown. The tool's free hooked end 5 is inserted into the opening 41 (see step (d)) formed by the two angled cross over wire ends and the tool's hook is extended into this opening until the joining notch between hook leg 7 and back section 11 engages the wire. Holding the wires free ends firmly between one's thumb and forefinger (step (e)) the in-place tool handle 19 is rotated as shown. As this happens, the wire 35, which is fixed by the user, starts to rotate against the resistance imposed by the hook/handle rotatable connection. This rotation results in the wire forming a tight stranded helical wrap fit 43 as shown in the complete eye-wire attachment in step (f).

Should the fishing attachment 39 have a swivel attachment with its eye 37, then in step (e), the tool's hook is passed through the same eye 37 as the wire (rather than the wire opening 41) and its handle rotated to braid the wire to the eye.

The stainless steel tool hook components are manufactured using conventional wire bending techniques. This involves stamping and shaping the wire between a hardened steel die within a hydraulic press. Once stamped, secondary polishing and cleaning procedures are employed to give a smooth professional finish.

The tool's hook holding head 3 and hollow body 19 can be manufactured of ABS (Acrylonitrile-butadiene-styrene) plastic using the injection molding process. Injection molding is a plastic molding process whereby heat softened plastic material is forced under very high pressure into a metal cavity mold, usually aluminum or steel, which is relatively cool. The inside cavity of the mold is comprised of two or more halves, and is the same desired shape as the product to be formed (in this case the head and body). High pressure hydraulics are used to keep the mold components together during the actual injection phase of the molding process. The injected plastic is allowed to cool and harden in the mold. The hydraulics holding the multiple component mold cavity together are released, the mold halves are separated and the solid formed plastic item is removed. Injection molding can be highly automated process and is capable of producing extremely detailed parts at a very cost effective price. The process should be invaluable in producing this invention's tool head and body cost effectively.

Although the Stranded Wire Tool and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A tool for attaching fishing attachments comprising:

a hook end having a first angled leg with an open free end joined to a back section, said back section having a second angled leg connected thereto, said first angled leg and said second angled leg tapering together towards each other in the direction of the open free end, a hook head section fixed to an end of said second leg, and an elongated body member rotatably mounted to said hook head section, whereby said hook head section and hook end may rotate together with respect to said body member, and said hook head section has a plurality of spaced ridges extending around its periphery, and said elongated body member is hollow with an open end, said elongated body member having an internal groove to receive said spaced ridges to rotatably mount said hook head section to said elongated body member.

2. The tool for attaching fishing attachments as claimed in claim 1, also including a hollow cap mounted to said elongated body member, and adapted to fit over said hook end.

3. The tool for attaching fishing attachments as claimed in claim 2, further including a pocket clip attached to said elongated body member for attaching the tool to a user.

* * * * *